June 28, 1960  F. W. LANDSIEDEL ET AL  2,942,736
CRANE POSITIONING APPARATUS

Filed June 18, 1959  7 Sheets-Sheet 1

INVENTOR.
Frank W. Landsiedel
Herbert Wolff
BY

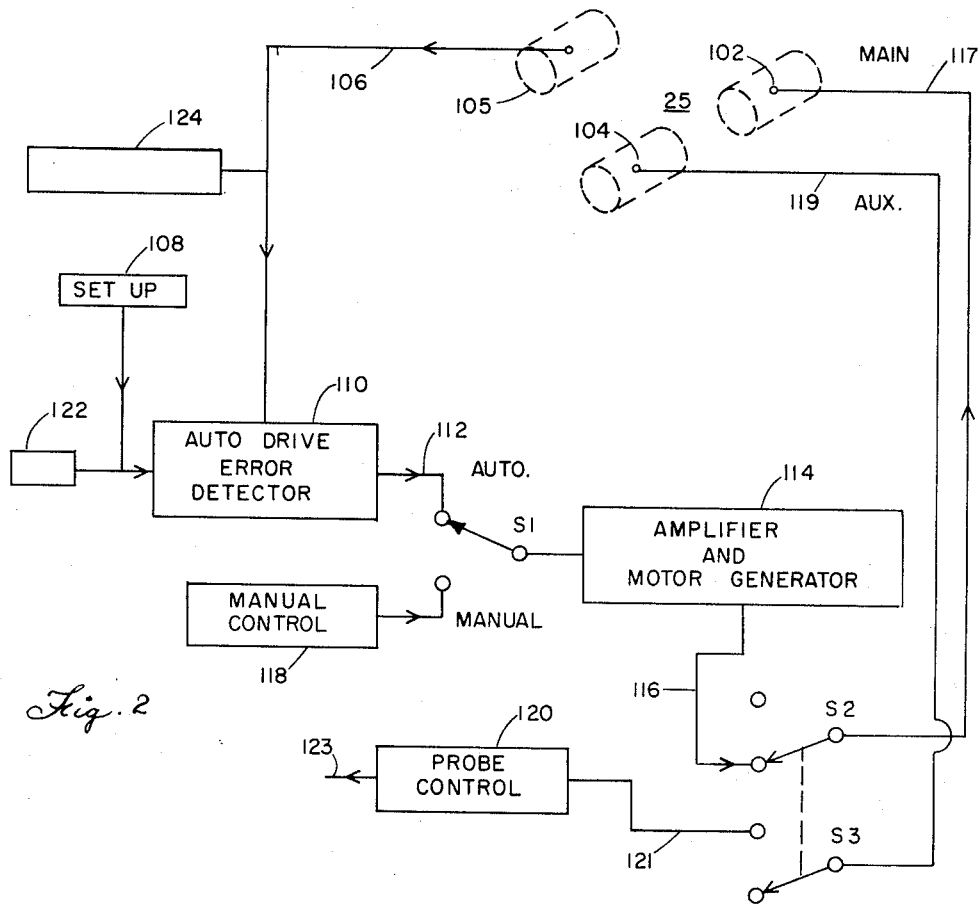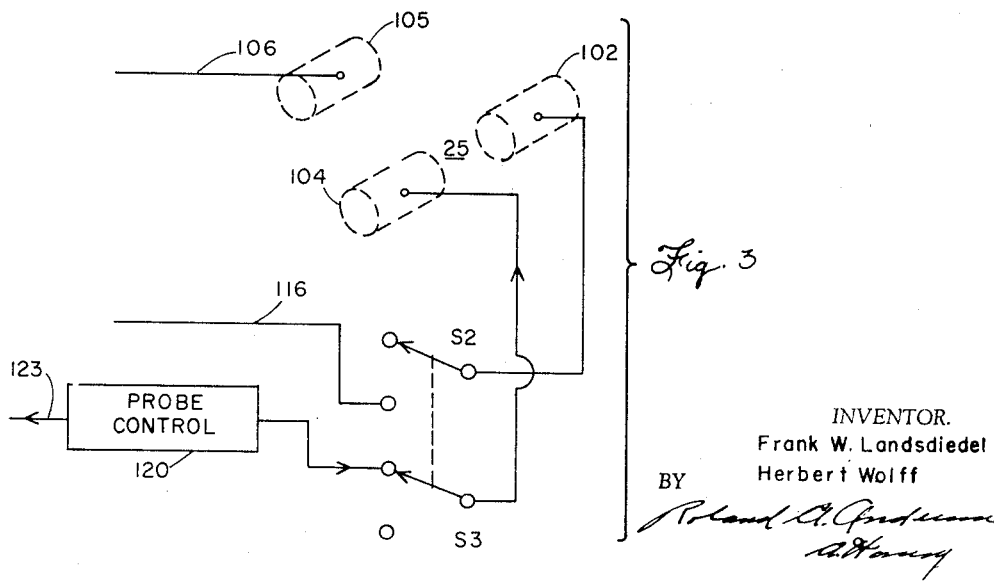

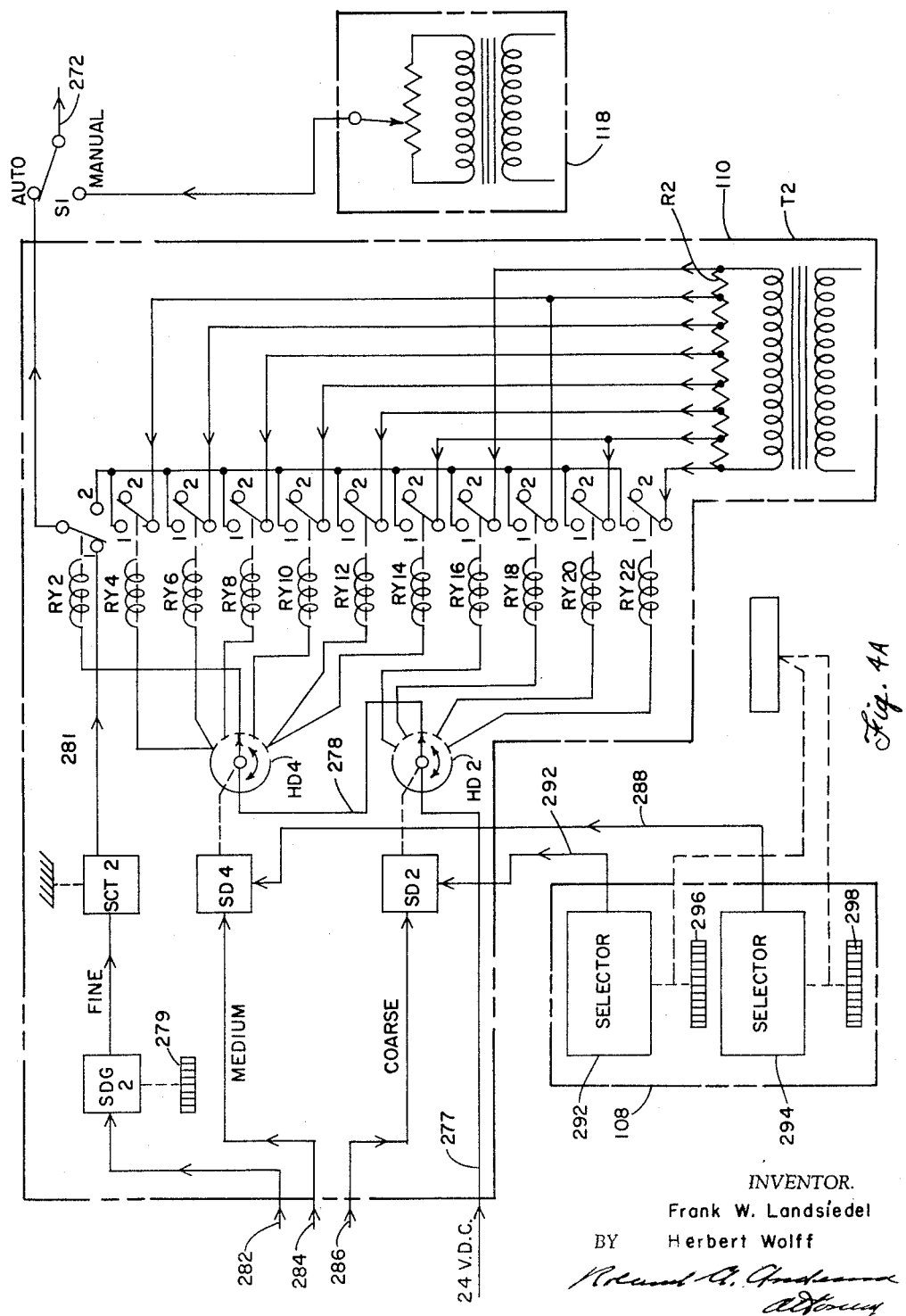

INVENTOR.
Frank W. Landsiedel
Herbert Wolff

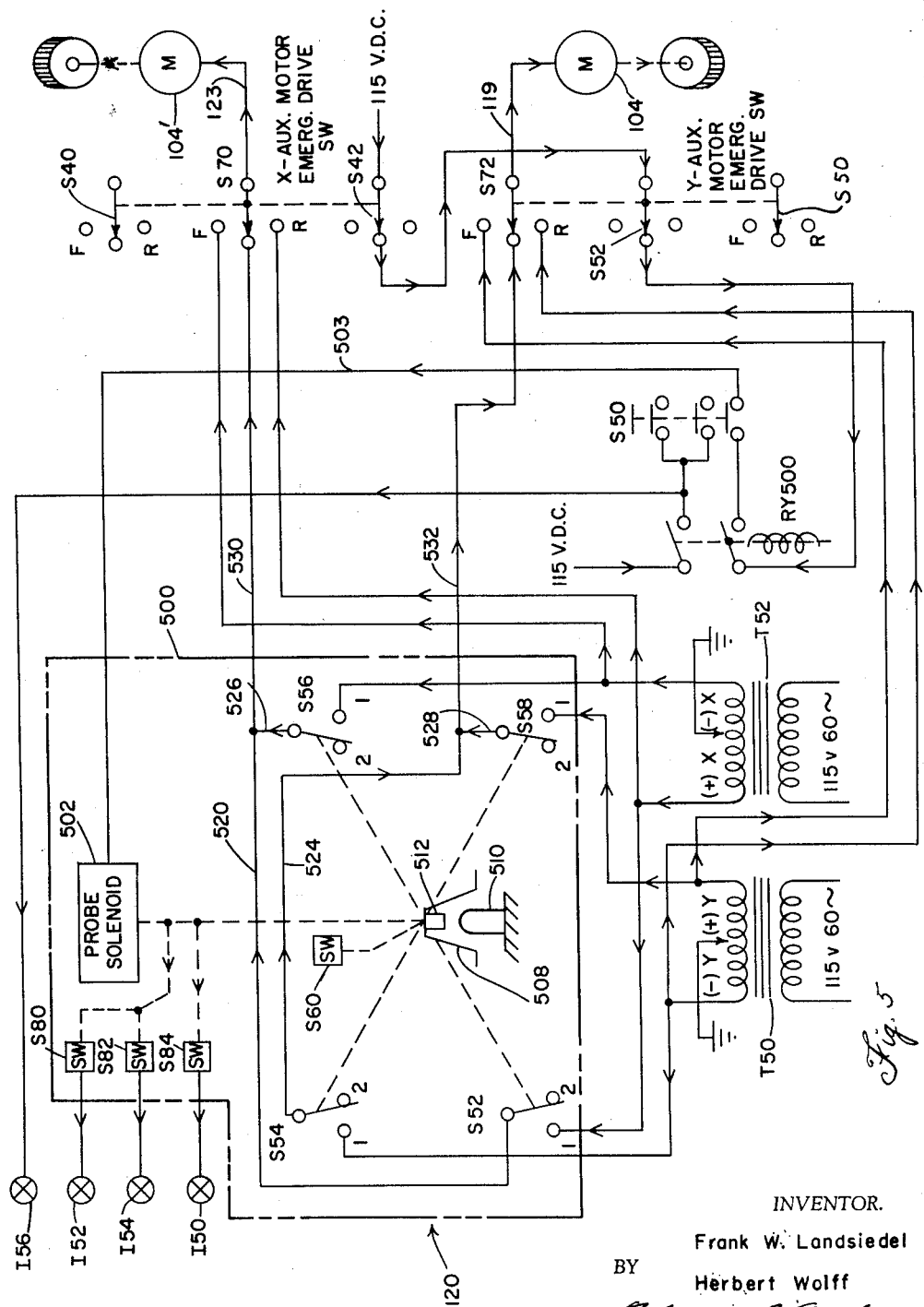

June 28, 1960

F. W. LANDSIEDEL ET AL 2,942,736

CRANE POSITIONING APPARATUS

Filed June 18, 1959

INVENTORS.
Frank W. Landsiedel
Herbert Wolff

BY

ATTORNEY

June 28, 1960 F. W. LANDSIEDEL ET AL 2,942,736
CRANE POSITIONING APPARATUS
Filed June 18, 1959 7 Sheets-Sheet 7

INVENTORS.
Frank W. Landsiedel
Herbert Wolff
BY

ATTORNEY

United States Patent Office 2,942,736
Patented June 28, 1960

2,942,736
CRANE POSITIONING APPARATUS

Frank William Landsiedel, Glen Head, and Herbert Wolff, Merrick, N.Y., assignors to the United States of America as represented by the United States Atomic Energy Commission Filed June 18, 1959, Ser. No. 821,340

9 Claims. (Cl. 212—21)

The present invention relates to crane positioning apparatus, and more particularly, to apparatus for accurately positioning a crane in a horizontal plane by automatic control means.

When a crane is used to transfer a load from one location to another, there is usually required one operator to manipulate the crane controls, another operator to properly secure the load to the crane, and still another operator to unload the crane at the proper location. For assisting the crane operator in locating the crane properly to facilitate loading and unloading of the crane at precisely the correct locations, it is customary for the various operators to resort to a system of hand signals. In situations where it is important to position the crane accurately, as where the objects to be lifted are fragile and where it is impossible to place an operator close enough to insure accurate alignment, as where the object to be handled is radioactive as in the case of nuclear reactor internals, the use of hand signals becomes inefficient, unreliable and, at the least, time consuming. But a crane designed with a completely automatic positioning system for use under conditions just mentioned would be very expensive and generally uneconomical, as would be an elaborate arrangement including a closed circuit television communication system or other electronic apparatus.

The present invention provides for a relatively simple and economic arrangement incorporating many desirable automatic features for accurately aligning a crane to load or unload heavy objects. Briefly described, the invention consists of a novel mechanical and electrical arrangement for automatically making the final movements of the crane so as to align accurately the mast assembly of the crane with the position where the object is to be loaded or unloaded. It has been found that once the crane mast is so aligned with great accuracy, no local manual assistance is required, and completely remotely controlled means may be used to connect or disconnect the clamshells or other crane members used to grip the load. For this purpose, there is provided a mechanical probing unit which would be mounted conveniently on the crane mast, such unit, for example, having a mushroom-shaped element which, when actuated, closes appropriate switches to operate through appropriate electrical apparatus auxiliary motors to bring the crane into accurate alignment with a preselected vertical axis. A pin is located beneath the crane with which the mushroom unit comes in contact in order to carry out this automatic operation. Other suitable servo apparatus, not forming a part of this invention, may be used to locate the crane sufficiently close, as within ¼" of proper location, before resorting to the automatic arrangement of this invention.

It is thus a first object of this invention to provide novel apparatus for accomplishing the accurate alignment of a crane.

It is a further object of this invention to provide an electrical control arrangement for automatically bringing a crane into a preselected horizontal position.

Still another object of this invention is to provide a mechanical sensing device adjustable in a horizontal plane for detecting misalignment with a preselected vertical axis and activating proper switching apparatus for bringing about its readjustment into proper alignment.

It is still a further object of this invention to provide novel mechanical and electrical apparatus for controlling the operation of a hoisting crane.

Other objects and purposes of this invention will hereinafter become more apparent in the light of the following description taken in connection with the accompanying drawings in which:

Figures 2 and 3 show block diagrams of the Y-direction and X-direction drive and control systems for the crane of Figure 1;

Figures 4A and 4B show details of the automatic drive system in the Y-direction;

Figure 5 shows details of the probe control system; and

Description of the crane

Figure 1:
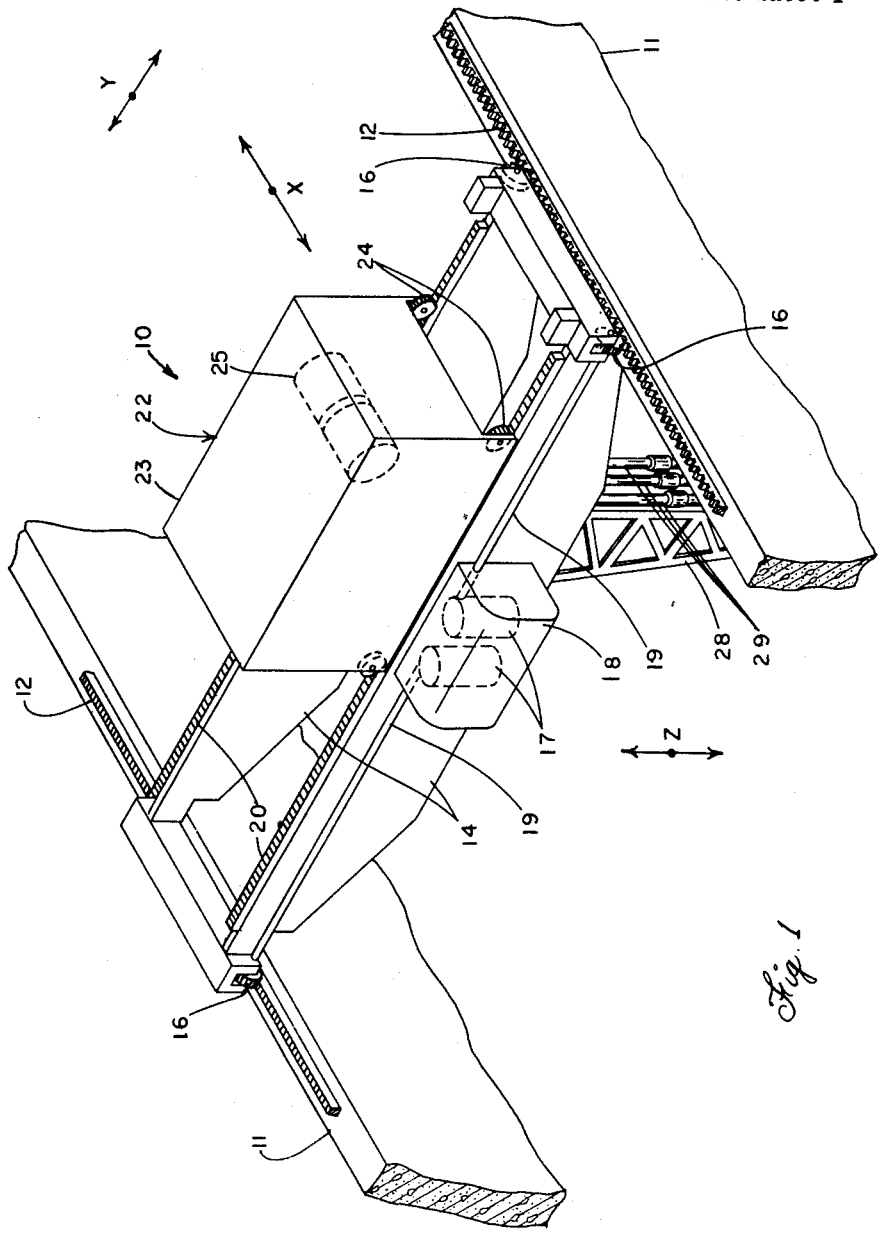
Figure 1 is a perspective view of a typical crane embodying this invention.

Referring to Figure 1, there is shown, somewhat schematically, a typical crane 10 controlled in accordance with the principles of this invention consisting of a pair of toothed racks or tracks 12 mounted on walls or abutments 11 and having a pair of bridge members 14 spanning thereacross supported on tracks 12 by toothed wheels 16 for movement in the direction designated the X-direction. Electric motors 17 in housing 18 are used to propel bridge members 14 in the X-direction by appropriate drive shafts 19 connected to wheels 16. Bridging tracks 20 provided on members 14 is a trolley 22 mounted on toothed wheels 24 engaged with tracks 20. Electric motors 25 for driving wheels 24 to thereby propel trolley 22 in the Y-direction are enclosed within housing 23 and connected in convenient fashion (not shown) to wheels 24. A mast assembly 28 supporting three masts 29 extends downwardly from and is supported by trolley 22 between bridge members 14. On masts 29 are mounted the usual remotely operated chucks, clams and other means (not shown) for gripping or attaching to the object to be lifted. Movement in the vertical or Z-direction is provided by means (not shown) not forming a part of this invention.

General description of the Y-drive and X-drive systems

Figure 2 shows a schematic illustration of the arrangement providing for the movement of trolley 22 in the Y-direction along tracks 20. Except for minor differences to be later pointed out, this system is the same arrangement provided for in the movement of bridge members 14 in the X-direction along tracks 12.

For moving trolley 22 in the Y-direction along tracks 20, there is provided a pair of electric motors 25 identified individually as main motor 102 and auxiliary motor 104, respectively. These motors operate independently of each other and only one at a time, depending upon where the power comes from and the manner in which the control is exercised, as will be hereinafter described. Also provided in trolley 22 is means 105 which will be more particularly described later for feeding back an electrical signal on line 106, giving displacement information on the position of trolley 22 along tracks 20. A set-up device 108 receives, by manual or automatic input, information on the selected position of trolley 22 in the Y-direction, and converts the information into a suitable signal for use in an auto drive error detector 110. Detector 110 compares the selected position signal from set-up 108 with the position signal on line 106, and an error signal produced by detector 110 is passed through line 112 and a switch S-1 in its Auto position as illustrated to an amplifier and motor generator 114 where the signal is treated as later described and passed by line 116 through a switch S-2 and line 117 to drive main motor 102 to move trolley 22 in the direction of canceling the error signal. If it is desired to exercise a manual control over this movement of trolley 22, then switch S-1 may be moved into its Manual position where an operator may, by suitable manipulation of the usual electric motor controls in a manual control 118, select a signal for use by motor 22 to a position visually observed by the operator. A pair of ganged switches S-2 and S-3 between generator 114 and motors 102 and 104 permits the transfer of control from the arrangement just described to that of a probe control 120 shown in Figure 3 for precise positioning in accordance with this invention. As illustrated, switches S-2 and S-3 are ganged either to connect generator 114 to energize main motor 102 or probe control 120 to energize auxiliary motor 104. In the actual use of this apparatus, manual or error detection devices 118 or 110 are used to position trolley 22 to a position within ¼ or less of the one selected and then switches S-2 and S-3 are flipped into their probe control positions where probe control 120 energizes motor 104 and operates automatically, as it will be later more particularly described, to position crane 10 accurately in its selected position. It is pointed out at this point that probe control 120 is common to both the X and Y-drives and acts to move crane 10 in both directions to accomplish the final adjustment, as will be more particularly described later. The usual indicators 122 and 124 may be used to indicate visually the selected and actual position of trolley 22. Figure 2 also illustrates the separate X-drive system utilizing, of course, other similar elements, with the exception of probe control 120 which, as already noted is common to both arrangements. Probe control 120 has a separate line 123 connected through similar switching apparatus to auxiliary X-direction motor 104' shown in Figure 5.

*Detailed description of Y-drive system*

Figure 4B:
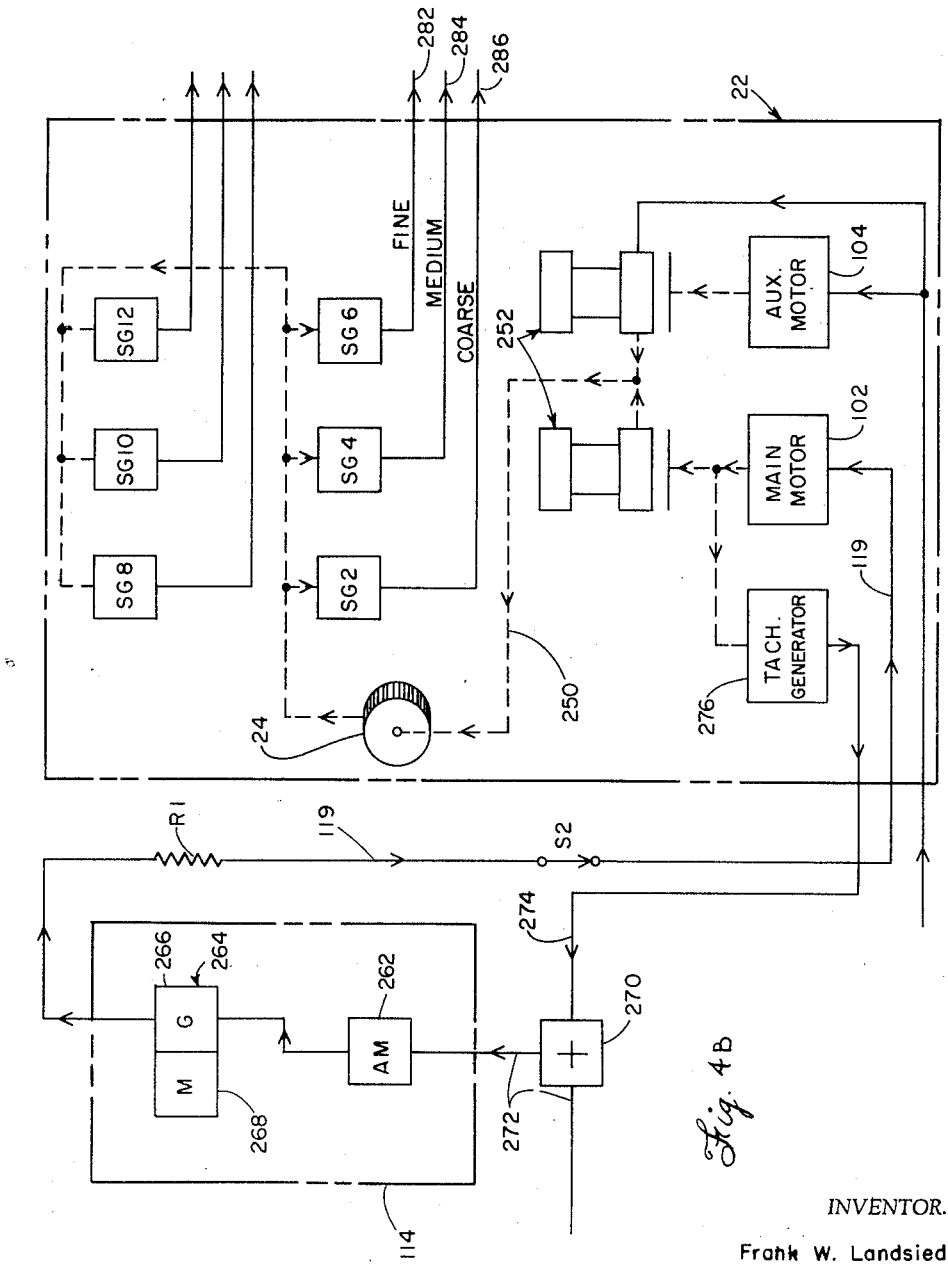

For details of the three speed synchro-controlled Y-drive system, reference is made to Figs. 4A and 4B. Y-drive wheels 24 for trolley 22 are driven through a mechanical connection, schematically illustrated as 250 (including shafts 19 shown in Figure 1) by either main electric motor 102 or auxiliary motor 104 through the usual clutching and speed reduction arrangement generally indicated as 252. At the particular instant the illustration is shown, main motor 102 is providing the drive for wheels 24, and it is being energized through line 119 from amplifier and motor generator unit 114 through switch S-2. Unit 114 consists of a servo amplifier 262 to amplify the error signal input and convert it to a D.C. signal. This amplification and conversion is required because the error signal must produce D.C. for the generator field of the Y-drive motor generator 264. As is understood in the art, the D.C. varies in the same way that the error signal varies. Y-drive motor generator 264 consists of a generator 266 which is driven at a constant speed by a motor 268 which is energized by a 440-volt, 60-cycle, 3-phase source (not shown). The armatures of both motor 268 and generator 266 are on the same shaft. However, the motor field and the generator field are entirely separate. The output of generator 266 depends on the current supplied to the generator field. When generator 266 field current is positive, the output thereof will be of a positive polarity. The greater the field current the greater will be the output of generator 266. Similarly, when the error signal is negative, the D.C. signal supplied to the field of generator 266 will be negative, and the output thereof will be of the negative polarity, thereby resulting in the reversal of direction motor 102. The error signal comes from a line 272 and is made to pass through a differential 270 wherein it is compared with a damping voltage signal on line 274 produced by a tachometer generator 276 mechanically driven by main motor 102. As is understood in the art, tachometer generator 276 produces a signal in response to the acceleration of motor 102 and, in effect, prevents overshooting of motor 102 by tending to cancel transient voltages produced as a result of sudden changes in speed of motor 102.

The source of the Y-drive error signal for line 272 is shown in Figure 4A as coming from detector 110 through switch S-1 which in this case is in the Auto position. Detector 110 consists of a plurality of relays RY-2, RY-4, RY-6, RY-8, RY-10, RY-12, RY-14, RY-16, RY-18, RY-20 and RY-22. To each relay is connected an associated movable contact which is the Two position when the relays are unenergized. Included in detector 110 are also a pair of follow-up heads HD-2 and HD-4. Each of these heads is, as is understood in the art, a rotary type switch whose movable or rotating arms or wipers are positioned by the output shafts of synchro differential receivers SD-2 and SD-4, respectively. The contacts of both follow-up heads HD-2 and HD-4 are shown on their center contacts. This normal or balanced (biased) position of the wipers of these heads will always occur when there is no net difference (zero signal) between the two inputs applied to their respective synchro differentials. The center tap of head HD-2 is connected by line 277 to a 24-volt D.C. supply; while the center outer stationary contact of head HD-2 is connected by line 278 to the center tap of head HD-4. The center outer stationary contact of HD-4 is connected to relay RY-2. Thus, if the wiper of HD-2 is not on its center contact, that is, if the wiper is on some other contact, there can be no voltage applied to the center tap of head HD-4 because the wiper of HD-2 would be instead connected to the particular relay connected to the other contact at which it is positioned. Thus, it is seen that if no net signal is produced by either of the synchro differential receivers SD-2 or SD-4, relay RY-2 will be energized by the 24-volt D.C. supply thereby putting its movable contact in the One position (as illustrated) thereby passing the signal from line 281. Synchro differential receivers SD-2 and SD-4 provide for the coarse and medium adjustments, respectively, of main motor 102, so that fine adjustments may be delivered from synchro control transformer SCT-2 through the contacts of relay RY-2 in the One position. A differential generator SDG-2 compares an input selected by knob 279 with a displacement signal coming by line 282 from a source to be later described to accomplish the fine adjustment. Similarly, medium and coarse displacement signals are delivered by line 284 and 286 to the synchro differential receivers SD-4 and SD-2 which compare the displacement signals with that of the command order signals delivered by lines 288 and 292 from set-up device 108. Set-up device 108 may contain a pair of tens and units selectors 292 and 294 for coarse and medium selection of the Y-position. Each of the selectors has some provision, such as a manual knob 296 and 298, respectively, for adjusting a wiper on a potentiometer connected across a transformer similar to the arrangement shown in manual control device 118.

Each of relays RY-4 through RY-22 in detector 110 is connected through its Two position to deliver some voltage selected from a winding R-2 across an input transformer T-2. In this way, if there is a difference signal delivered by receivers SD-2 or SD-4, the movable contacts on heads HD-2 or HD-4 will select some positive or negative voltage from transformer T-2 to be delivered to position Two of the contact in relay RY-2. This will deliver a signal to amplifier 262 and motor generator 114 and ultimately to main motor 102 to move crane 10 in the direction of canceling the error signal existing on receiver SD-2 or SD-4 and will result in the medium positioning of crane 10 before the fine adjustment goes into effect. Feedback or displacement information from trolley 22 is provided by synchro generators SG-2, SG-4 and SG-6 which are mechanically connected in convenient fashion to record the coarse, medium and fine positions of trolley 22 on tracks 20. The signals from these generators are delivered by circuits 286, 284 and 282 to receivers SD-2, SD-4 and transformer SDG-2, respectively.

The operation of the circuit described and shown in Figures 4A and 4B is as follows: The operator adjusts knobs 296 and 298 in set-up order device 108 and the hand knob 279 of differential generator SDG-2 for selecting the exact preselected (within 1/8", for example) Y-position at which crane 10 should be adjusted. Then, as a result of the condition that crane 10 will probably not be in the position selected, synchro generators SG-2, SG-4 and SG-6 will produce a displacement signal of coarse, medium and fine value indicating the position of trolley 22. These three signals will be delivered to differential synchro SD-2, differential synchro SD-4 and the differential signal generator SDG-2, respectively, thereby putting into operation the follow-up heads HD-2 and HD-4 and their associated relays RY-2 through RY-22 to deliver a signal to the electrical differential 270 where it is compared to the sampling voltage on line 274 from tachometer generator 276 and then to the amplifier 262 as previously described above. As a result, generator 266 will produce a signal to rotate main motor 102 and thereby, through the mechanical linkage generally indicated as 252, rotate toothed wheels 25 and position trolley 22 to the place selected by the operator. Repeat back synchro generators SG-8, 10 and 12 may also be provided to deliver displacement signals to be used in an automatically functioning graphic display arrangement for showing to the operator the instantaneous position of crane 10, but this arrangement is not herein disclosed and does not form a part of this invention. It should also be understood that if desired a fully automated scheduled input such as could be provided by digital computer apparatus using punched tapes may be used in the place of the manual set-up order device 108.

Description of X-drive system

The X-drive system provides for the movement of bridge members 14 of crane 10 along tracks 12 on abutments 11, as previously noted. Motor 17 shown in Figure 1 provides the drive in this direction. As already noted in connection with the description of the Y-drive system, the X-drive system is similar to the latter in all important respects.

If there is greater length of travel involved in the X-direction than in the Y-direction, the X-drive system may, if desired, be made to differ over the Y-drive system by providing for a four-speed, synchro-controlled servo system instead of the three-speed drive used in the Y-direction. In providing for this type of drive, the only difference presented in the circuitry would appear in Figures 4A and 4B where, in addition to the two selectors 292 and 294 illustrated, there would be a third selector designated the hundreds selector, and instead of the two follow-up heads, HD-2 and HD-4, there would be a third one for the hundreds selector and, of course, the associated follow-up head actuated relays to accompany the additional follow-up head. Also, there would be an additional synchro differential receiver connected up in the same way as the other illustrated, and there would also be an additional drive control synchro and a repeat back synchro for the hundreds values. Connecting up these various elements would also involve the use of a fourth electrical line paralleling the fine, medium and coarse lines of the three-drive system.

Another difference which might exist in the X-drive system over the three-drive arrangement would be in the provision for offsets to compensate for the displacement of masts 29 from a predetermined axis if more than one is used, as illustrated. The offset circuitry, not forming a part of this invention, would compensate for the shift in base axis or line due to switching from one mast to another. Since the offset circuitry forms a part of the rough location of crane 10, it does not form a part of this invention and hence will not be particularly described. Thus, for the purposes of this invention, the use of a single mast 29 may be presumed.

The next difference which may exist between the X-drive system and the Y-drive system would be in the case where more than crane were being used on the tracks 12. In that particular situation, it would then be necessary to provide collision circuitry to prevent the accidental collision of the cranes in their independent movement along tracks 12. This, too, does not form a part of this invention, is not necessary to the operation of crane 10, would not be used when crane 10 is used alone, and therefore is not described.

Description of probe drive control system

As already noted, when the X and Y drive control systems position crane 10 into its approximate position (e.g. within 1/8") the operator then moves ganged switches S-2 and S-3 into position so that probe control 120 can provide the final and accurate positioning, automatically, of crane 10 in order to place mast assembly 28 exactly over the location selected. As seen schematically in Figure 5, the X and Y auxiliary motors 104' and 104 are controlled by a common probe unit 500 forming part of control 120. Probe unit 500 comprises a probe solenoid 502 energized by a probe control switch S-50 which, upon manual closing and simultaneous energization of probe enabling interlock circuit relay RY-500, the latter by other means (not shown) not forming a part of this invention, will deliver a 115-volt D.C. supply to solenoid 502 by line 503. Connected physically to probe solenoid 502 is a mushroom shaped element 508 which will be later more particularly described in connection with Figures 6 and 7. Mushroom 508 is connected to a plurality of switches S-52, S-54, S-56 and S-58, each having positions One and Two, the latter position of which is the normal unenergized position, as illustrated. When mushroom 508 is tilted by a probe pin 510 in the direction, for example, of switch S-54, the movable contact thereof is urged into its One position. Delivered to positions One of each of these switches is + or —Y or + or —X, respectively, A.C. supplied from Y and X auxiliary power transformers T-50 and T-52, respectively, which are provided for this purpose. By +Y is meant a signal which, when delivered to auxiliary motor 104, will drive trolley 22 in some preselected direction while a —Y signal will cause movement in the opposite direction. Switches S-54 and S-58 are the —Y and +Y drive probe switches, respectively, while switches S-52 and S-56 are the +X and —X drive probe switches, respectively. Probe pin 510 is located on some point below crane 10. It may be located on the object to be lifted in some predetermined orientation with the lifting fixture. If, upon lowering probe unit 500, mushroom 508 is not exactly centered over probe pin 510, thereby indicating that crane 10 is not located in exactly the position desired, probe pin 510 will contact some portion of mushroom 508, indicating the nature of the eccentricity, that is, whether the eccentricity is in the X-direction or the Y-direction and the polarity of the eccentricity. In accordance with this eccentricity, the appropriate switch of the group of switches S-52 through S-58 will be closed into its One position with the result that there will be delivery through this particular switch of the proper A.C. power to the proper auxiliary motor to move crane 10 until the probe pin 510 is centered within mushroom 508 without contacting the periphery thereof. This centering action will occur continuously and automatically until probe pin 510 comes in contact with a button 512 located in the central portion of mushroom 508 which is connected to close a probe engaged switch S–60, causing the indicator lamp I–50 to light, thereby indicating that crane 10 is centrally located over the exact point where it will be needed. Then probe unit 500 may be withdrawn by releasing switch S–50 which causes the de-energization of probe solenoid 502. A pair of indicator lamps I–52 and I–54, respectively, are provided to indicate whether probe solenoid 502 is "up" or "down." A fourth lamp, I–56, may be provided to be energized by the closing of probe control switch S–50 to indicate thereby whether or not the probe unit 500 is energized.

Proper circuitry is provided to deliver the signal generated by probe unit 500 to the correct auxiliary motor. From each of the drive probe switches S–52 through S–58 there is an electrical lead designated 520, 524, 526 and 528, respectively. Leads 520 and 526 come together to form a common lead 530 which passes through the center contacts in a switch S–70 to deliver the signal to the X auxiliary motor 104' to position crane 10 in the X direction. Leads 524 and 528 come together to form common lead 532 to deliver the fourth signal through the center contacts of a switch S–72 to deliver the probe signal to the Y auxiliary motor 104 and thereby position crane 10 in the Y direction. Switch S–70, which may be described as the X auxiliary motor emergency drive switch, is provided to permit emergency manual operation of the auxiliary motor, and for this purpose a pair of additional contact positions, F and R, are provided leading to the +X and −X power source positions of the X auxiliary motor transformer T–52. In a similar fashion, Y auxiliary motor emergency drive switch S–72 is provided with positions F and R connected to the +Y and −Y taps of the Y auxiliary motor transformer T–50 so that, if desired, Y auxiliary motor may be manually controlled. Manually adjustable arms S–40 and S–50 of switches S–70 and S–72 ganged to the movable contacts thereof are provided to permit manual section of the mode of operation. An additional ganged contact S–42 and S–52 for S–70 and S–72, respectively, are provided to insure power to switch S–50 during non-emergency operating conditions.

Figure 6:
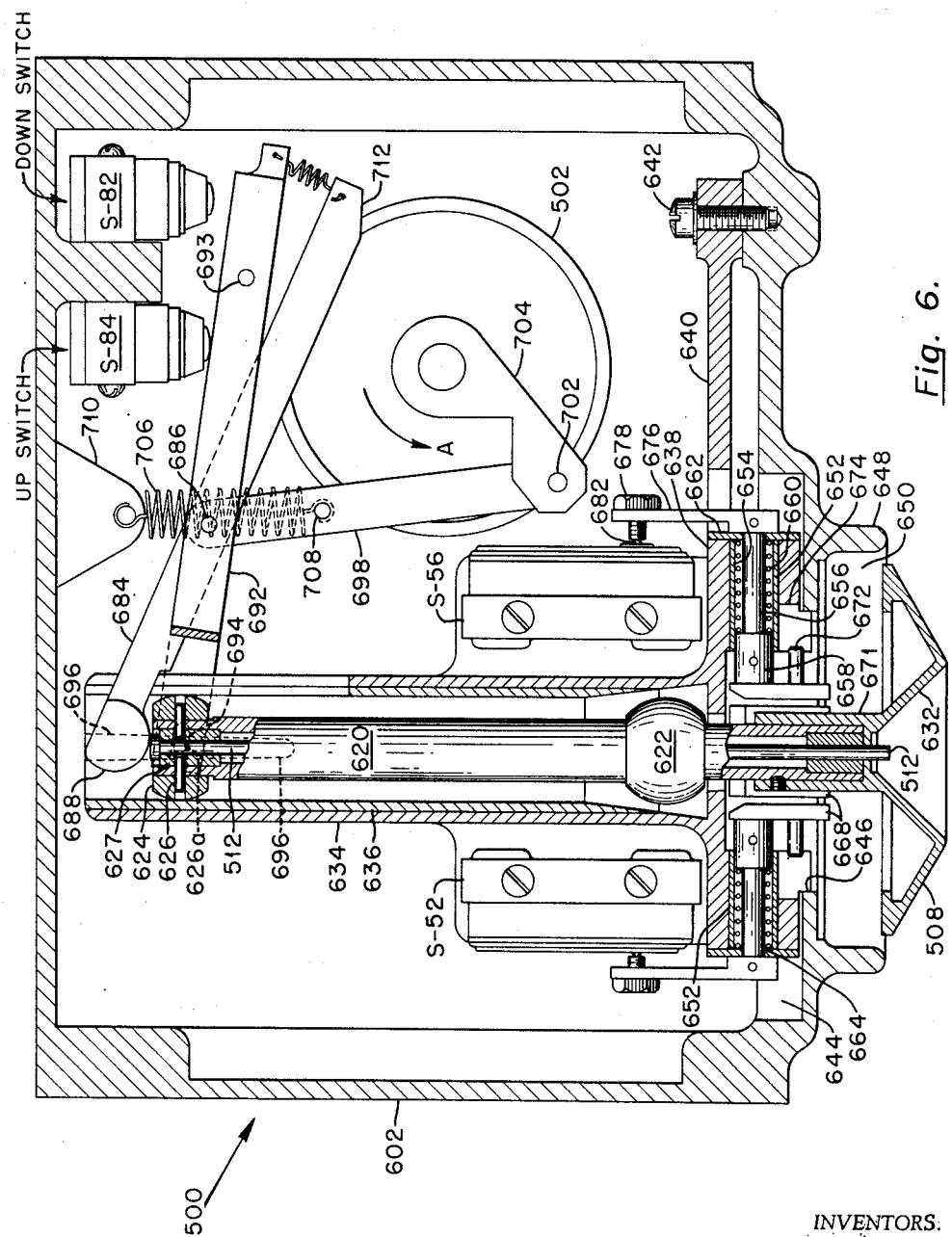
Figures 6 and 7 illustrate a suitable mechanical arrangement for the probe unit illustrated schematically in Figure 5.
Figure 7:
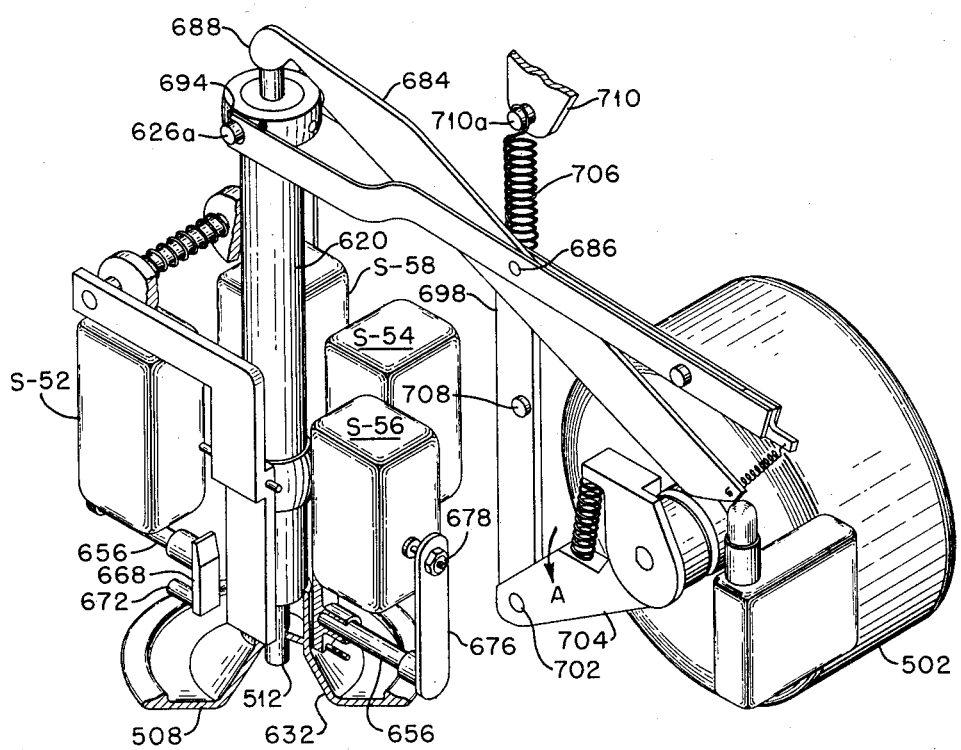

A suitable mechanical arrangement for carrying out the functions described with reference to the probe drive system illustrated in Figure 5 is shown in Figures 6 and 7. In this arrangement, probe unit 500 is seen to comprise within a casing 602 an elongated, vertically disposed shaft 620 provided with bulbous portion 622 and a piston section 624 having a spherical outer surface for a reason to be later described. A pair each of pins 626 and 626a and a plug 627 may be used to hold the assembly together. Shaft 620 is hollow to permit passage therethrough of control rod 512 which extends out both ends of shaft 620, as illustrated. The bottom portion of shaft 620 has mounted thereon mushroom element 508 with an inner, downwardly expanding section 632 through the center of which passes rod 512. Shaft 620 and mushroom 508 move together in a vertical direction as an assembly, while rod 512 can move with this assembly or can be made to move independently of shaft 620, as will be hereinafter described. The curved outer surface of piston 624 permits limited pivoting thereabout due to transverse movement of mushroom 508.

Shaft 620 is slidably mounted within a cylindrical hollow element 634 having a sleeve 636 mounted therein. Cylindrical element 634 terminates at its bottom in a circular flange-like portion 638 to which there is attached, by means not shown, a supporting disk 640 which is bolted to casing 602 by at least one bolt 642 as illustrated. Casing 602 has a cylindrical depression 644 at the bottom thereof to accommodate the mounting of flange 638 and cylindrical tube 634 and is provided with an opening 646 to permit passage therethrough of the bottom portion of shaft 620. Opening 646 is provided with a circular lip 648 which forms a cavity 650 to permit the retraction therein of mushroom member 508 when not in use.

Flange-like portion 638 may be provided with a plurality of three cylindrical openings 652 extending radially from the outer periphery of flange 638 into an interior cavity which joins the interior of sleeve 636. Mounted within each opening 652 is a sleeve 654 and a movable piston-like element 656 having an enlarged section 658 to permit mounting within sleeve 654 a bias spring 660 which is mounted between one surface of piston section 658 and the interior surface of a stationary plate 662 which surrounds flange 638. Plate 662 has a plurality of three holes 664 to accommodate the pistons 656. A surface of each piston section 658 facing shaft member 620 is provided with a pivot plate 668 which faces but is spaced from the adjoining surface of the top cylindrical section 671 of mushroom member 508. A pin 672 extending from each plate 668 into a slotted section 674 of flange 638 prevents the rotation of plate 668 and piston shaft 656. It will be seen that spring 660 biases the piston member 656 with pivot plate 668 in its most inward position as illustrated. The end of piston member 656 away from shaft 620 extending through opening 664 in plate 662 is attached to a contact member 676 with an adjustable screw 678. In the normal biased position, as illustrated, the bottom surfaces of screws 678 maintain in a depressed position the contacts 682 of which each is connected to its appropriate switch. There are four switches provided, namely S–52, S–54, S–56 and S–58, as previously described, of which switches S–52 and S–56 are illustrated in Figure 6. However, as shown in Figure 7, S–58 is located more conveniently elsewhere and a lever 679 pivoted about a shaft 679a is used to transfer contact from mushroom 508 to switch S–58. Thus with the contacts of the switches in their normal Two position, as illustrated, this represents the depressed position of the contact elements 682. It is seen that when mushroom element 508 is pivoted to the side or moved in a transverse direction as a result of probe pin 510 contacting the interior surface 632 of element 508 causing this transverse displacement, one of the switch elements 676 will be moved away from plate 662 surrounding flange 638 thereby permitting the release of contact 682 and, in effect, permitting the movement of the movable switch element to its One position. It is understood that switches S–52, S–54, S–56 and S–58 are conventional microswitches which are normally (when not biased) in their One position.

In order to provide for the associated actuating and indicating apparatus for the control unit, as described in connection with Figure 5, there are provided, as also shown in Figures 6 and 7, within casing 500 the appropriate means by which this is accomplished. For engagement, for example, with the top surface of shaft 620, there is provided a lever 684 pivoted about a shaft 686. One end of lever 684 is provided with a circular portion 688 for making contact with the top of rod 512 as illustrated. Shaft 686 is also the pivot point for a second lever 692 which is comprised of a pair of elements spread so as to be forked adjacent cylindrical section 634 so as to form a U to surround the latter and permit lever 684 to be centrally disposed, as best shown in Figure 7. Lever 692 pivots about a pin 693 which is attached in convenient fashion to casing 602. Pin 626a extends out of piston element 624 and through a pair of slots 696 in sleeve 636 and cylindrical element 634 to engage with slots 694 in the forked elements of lever 692. Pin 686 is supported by one end of a link arm 698 which is supported at its opposite end by a pin 702 which is attached to the end of a crank arm 704. Crank arm 704 is attached integrally at its opposite end to probe solenoid 502 which is of rotary design so that when the latter is energized it will pull down in the direction of arrow A thereby pulling pin 686 down and causing the dropping of mushroom 508 into its active position. A spring 706 connected between pin 708 on link arm 698 and a pin 710a on bracket 710 attached to casing 602 provides bias for shaft 620 in its retracted position so that when solenoid 502 is de-energized mushroom element 508 will be retracted. Switch S–82 mounted conveniently from casing 602 is in contact with arm 692 when mushroom 508 is in its fully down or energized position of mushroom 508, thereby lighting up bulb I–52 shown in Figure 5. When mushroom 508 is in its retracted position, as illustrated, switch S–84 similarly mounted is depressed thereby lighting up bulb I–54 indicating this position of probe mushroom 508. As shown in Figure 6, mushroom 508 is shown in a partially retracted or energized position just being released.

Thus it is seen that when mast 28 is positioned in its approximate location by the X and Y control driver, switch S–3 in Figure 2 is flipped into the probe control position whereby the apparatus shown in Figures 5, 6 and 7 can take over the final positioning of mast 28. It is understood that a probe element 510 is mounted on or adjacent to the object to be lifted, and that the unit 500 is mounted on the bottom of mast 28 in some convenient location. The operator of the crane permits the clam shells to be lowered at a very slow rate, and all of the corrections in the X and Y directions will take place as the clam shells are being lowered.

While only a preferred embodiment of this invention has been described, it is understood that certain changes may be made without departing from the principle of this invention.

What is claimed is:

1. In crane positioning apparatus having servo means for positioning said crane within close proximity of a predetermined vertical axis, said crane provided with a vertically descending member, means for automatically bringing about the fine adjustment of said crane into said axis comprising, in combination, a pair of motors for moving said crane along a pair of horizontal axes, respectively, at right angles to each other, switch means on said member for making contact with a stationary element to indicate displacement of said crane from said predetermined vertical axis as said member descends, said switch means including two pair of switches each of which when actuated energizes one of said motors to move said crane in one direction along one of said horizontal axes, said switch means responsive to said displacement by closing at least one of said switches to produce a signal corrective of misalignment of said crane, and means for passing said corrective signal to at least one of said motors for readjusting the position of said crane until a corrective signal is no longer produced.

2. In crane positioning apparatus having servo means for positioning said crane within close proximity of a predetermined vertical axis, said crane provided with a vertically descending member, means for automatically bringing about the fine adjustment of said crane into said axis comprising, in combination, a pair of motors for moving said crane along a pair of horizontal axes, respectively, at right angles to each other, control means on said member for making contact with a stationary element to indicate displacement of said crane from said predetermined vertical axis as said member descends, said control means including a tiltable member and two pairs of switches each of which when actuated by contact with said tiltable member energizes one of said motors to move said crane in one direction along one of said horizontal axes, said control means thereby being responsive to said displacement by closing at least one of said switches to produce a signal corrective of misalignment of said crane, and means for passing said corrective signal to at least one of said motors for readjusting the position of said crane until a corrective signal is no longer produced.

3. In crane positioning apparatus having servo means for positioning said crane within close proximity of a predetermined vertical axis, said crane provided with a vertically descending member, means for automatically bringing about the fine adjustment of said crane into said axis, comprising, in combination, a pair of motors for moving said crane along a pair of horizontal axes, respectively, at right angles to each other, control means on said member for making contact with a stationary element to indicate displacement of said crane from said predetermined vertical axis as said member descends, said control means including a tiltable member and two pair of switches each of which when actuated by contact with said tiltable member energizes one of said motors to move said crane in one direction along one of said horizontal axes, said control means responsive to said displacement by closing at least one of said switches to produce a signal corrective of misalignment of said crane, means for passing said corrective signal to at least one of said motors for readjusting the position of said crane until a corrective signal is no longer produced, and a fifth switch located on said control means for indicating upon closing the proper positioning of said crane.

4. In crane positioning apparatus having servo means for positioning said crane within close proximity of a predetermined vertical axis, said crane provided with a vertically descending member, means for automatically bringing about the fine adjustment of said crane into said axis comprising, in combination, a pair of motors for moving said crane along a pair of horizontal axes, respectively, at right angles to each other, control means on said member for making contact with a stationary element to indicate displacement of said crane from said predetermined vertical axis as said member descends, said control means including a tiltable member and two pair of switches each of which when actuated by contact with said tiltable member energizes one of said motors to move said crane in one direction along one of said horizontal axes, said control means responsive to said displacement by closing at least one of said switches to produce a signal corrective of misalignment of said crane, for passing said corrective signal to at least one of said motors for readjusting the position of said crane until a corrective signal is no longer produced, and solenoid actuated means for retracting said control means after said crane is properly positioned.

5. Apparatus for automatically placing a vertically descending member in a predetermined vertical axis comprising, in combination, a control unit mounted on said member for making engagement with a stationary probe as said member descends, said unit consisting of a tiltable truncated right circular conical element with the axis thereof vertically disposed and the mouth of said element facing said probe, a plurality of switches surrounding said element and each actuated by said element when tilted by said probe indicating the direction of displacement of said element from said vertical axis and means energized by an actuated switch to move said member in a horizontal direction cancelling said displacement.

6. Apparatus for automatically placing a vertically descending member in a predetermined vertical axis comprising, in combination, first motor means for moving said member in a first horizontal direction, second motor means for moving said member in a second horizontal direction perpendicular to said first direction, a control unit mounted on said member for making engagement with a stationary probe as said member descends, said unit consisting of a tiltable truncated right circular conical element with the axis thereof vertically disposed and the mouth of said element facing said probe, a plurality of switches surrounding said element and each actuated by said element when tilted by said probe indicating the direction of displacement of said element from said vertical axis, and means connecting said switches with said first and second motor means for energizing the latter in the direction of returning said element to the nontilted position.

7. Apparatus for automatically placing a vertically descending member in a predetermined vertical axis comprising, in combination, a first motor means for moving said member in a first horizontal direction, second motor means for moving said member in a second horizontal direction perpendicular to said first direction, a control unit mounted on said member for making engagement with a stationary probe as said member descends, said unit consisting of a tiltable truncated right circular conical element with the axis thereof vertically disposed and the mouth of said element facing said probe, a plurality of switches surrounding said element and each actuated by said element when tilted by said probe indicating the direction of displacement of said element from said vertical axis, means connecting said switches with said first and second motor means for energizing the latter in the direction of returning said element to the non-tilted position, and switch means protruding through the apex of said element for indicating upon contact with said probe the proper positioning of said member.

8. A displacement sensitive device comprising, in combination, a truncated right circular conical element, hollow shaft means extending from and rigidly connected to the apex of said element along the central axis thereof, means for enclosing said shaft means permitting axial motion thereof and limited tilting of said element about the free end of said shaft means, a plurality of switches mounted around said shaft adjacent said element apex for being selectively closed by the tilting of said element, solenoid actuated means for selectively retracting and extending said hollow shaft means and element, independently slidable shaft means extending through said shaft means and element and out both ends thereof, and indicator means responsive to the movement of said independently slidable shaft means toward the free end of said hollow shaft means for indicating zero displacement.

9. A displacement sensitive device comprising, in combination, a truncated right circular conical element, hollow shaft means extending from and rigidly connected to the apex of said element along the central axis thereof, a casing for supporting said hollow shaft means, means within said casing for enclosing said shaft means permitting axial motion thereof and limited tilting of said element about the free end of said shaft means, a plurality of switches mounted around said shaft within said casing adjacent said element apex for being selectively closed by the tilting of said element, solenoid actuated means for selectively retracting and extending said hollow shaft means and element, the latter within and outside said casing respectively, independently slidable shaft means extending through said shaft means and element and out both ends thereof, and indicator means responsive to the movement of said independently slidable shaft means toward the free end of said hollow shaft means for indicating zero displacement.

No references cited.